US010108882B1

(12) United States Patent
Cheriyadat et al.

(10) Patent No.: US 10,108,882 B1
(45) Date of Patent: Oct. 23, 2018

(54) METHOD TO POST AND ACCESS INFORMATION ONTO A MAP THROUGH PICTURES

(71) Applicants: Anil Cheriyadat, Knoxville, TN (US); Brent McFerrin, Plano, TX (US); Harini Sridharan, San Jose, CA (US)

(72) Inventors: Anil Cheriyadat, Knoxville, TN (US); Brent McFerrin, Plano, TX (US); Harini Sridharan, San Jose, CA (US)

(73) Assignee: Sturfee, Inc., Sunnyvale, CA (US)

( * ) Notice: Subject to any disclaimer, the term of this patent is extended or adjusted under 35 U.S.C. 154(b) by 87 days.

(21) Appl. No.: 15/155,867

(22) Filed: May 16, 2016

Related U.S. Application Data

(60) Provisional application No. 62/162,677, filed on May 16, 2015.

(51) Int. Cl.
| | | |
|---|---|---|
| *G06K 9/62* | (2006.01) | |
| *G06K 9/20* | (2006.01) | |
| *G06T 19/00* | (2011.01) | |
| *G06T 15/20* | (2011.01) | |
| *G06T 19/20* | (2011.01) | |
| *G06F 17/30* | (2006.01) | |

(52) U.S. Cl.
CPC ..... *G06K 9/6206* (2013.01); *G06F 17/30241* (2013.01); *G06F 17/30268* (2013.01); *G06K 9/209* (2013.01); *G06T 15/205* (2013.01); *G06T 19/003* (2013.01); *G06T 19/20* (2013.01); *G06T 2200/04* (2013.01); *G06T 2215/16* (2013.01)

(58) Field of Classification Search
None
See application file for complete search history.

(56) References Cited

U.S. PATENT DOCUMENTS

| | | | | |
|---|---|---|---|---|
| 7,764,984 | B2 * | 7/2010 | Desmedt | A61B 6/12 |
| | | | | 600/424 |
| 8,649,565 | B1 * | 2/2014 | Kim | G06K 9/00369 |
| | | | | 382/106 |
| 9,171,402 | B1 * | 10/2015 | Allen | G06T 17/05 |
| 9,259,645 | B2 * | 2/2016 | Takeuchi | G06T 15/20 |
| 9,396,697 | B2 * | 7/2016 | Adlers | G06T 3/60 |
| 2009/0259976 | A1 * | 10/2009 | Varadhan | G06T 15/20 |
| | | | | 715/850 |

(Continued)

*Primary Examiner* — Michelle M Entezari
(74) *Attorney, Agent, or Firm* — Royse Law Firm, PC

(57) ABSTRACT

Methods to access place data such as local business reviews, restaurant menus, merchant details, and other point-of-interest information directly from images is provided. Methods of the invention can enable users to interact with places digitally through pictures and videos. While digital images are captured, the location and orientation of the camera is also recorded. The method compares the digital images captured by the camera with images synthetically generated by a virtual camera placed inside a 3D geospatial model consisting of, for example, LIDAR, satellite image, and GIS data. The camera location and orientation of the virtual camera is iteratively refined until the synthetically generated image matches the camera image. The place information from the synthetically generated image is transferred to the actual picture once the match is completed. User can access the transferred place information directly through the picture.

22 Claims, 10 Drawing Sheets

(56) References Cited

U.S. PATENT DOCUMENTS

| | | | | |
|---|---|---|---|---|
| 2011/0018902 A1* | 1/2011 | Ofek | ................... | G06T 3/4038 |
| | | | | 345/629 |
| 2012/0289777 A1* | 11/2012 | Chopra | .............. | A61B 1/00009 |
| | | | | 600/109 |
| 2013/0094749 A1* | 4/2013 | Oh | ......................... | A61B 6/503 |
| | | | | 382/133 |
| 2013/0156297 A1* | 6/2013 | Shotton | ................ | G06K 9/6255 |
| | | | | 382/159 |
| 2014/0192159 A1* | 7/2014 | Chen | ....................... | G06T 15/20 |
| | | | | 348/46 |
| 2014/0247280 A1* | 9/2014 | Nicholas | ................. | G06F 3/011 |
| | | | | 345/633 |
| 2015/0077592 A1* | 3/2015 | Fahey | .................... | G06T 19/006 |
| | | | | 348/239 |
| 2015/0120054 A1* | 4/2015 | Watanabe | .............. | B25J 9/1612 |
| | | | | 700/259 |
| 2015/0362520 A1* | 12/2015 | Wells | ..................... | G01C 19/00 |
| | | | | 702/141 |
| 2017/0039765 A1* | 2/2017 | Zhou | .................... | G06T 19/006 |

* cited by examiner

METHOD TO POST AND ACCESS INFORMATION ONTO A MAP THROUGH PICTURES

CROSS-REFERENCE TO RELATED APPLICATIONS

This application claims the benefit of U.S. provisional patent application Ser. No. 62/162,677, filed on May 16, 2015, the disclosure of which is incorporated herein by reference.

BACKGROUND

Current map based applications require the user to identify places such as local businesses, stores, restaurants and other points-of-interest directly on the map. Typically, a user identifies a location of interest on the map directly or through a text search. Maps and satellite images that are currently used to access places make conceptualizing those places difficult. On the other hand, pictures and videos better represent such places. Thus, accessing place data directly through pictures or videos should be convenient and more intuitive. The invention is for a method enabling users to access or add place information directly through pictures and videos.

SUMMARY OF INVENTION

The invention provides systems and methods that enable users to post and access place information on a map through pictures.

The invention provides systems and methods that enable users to access information about places in a picture or video directly through a click on the image or video.

The invention provides systems and methods that enable users to locate places in a picture or video on the map.

Methods of the invention precisely recognize the businesses, stores, restaurants, and other points of interest shown in a picture.

The invented method enables user to take pictures or videos with cameras to access or add place information.

The invented method maps the pixels coordinates of places (e.g. stores, restaurants, hotels, offices) on the picture or video frame to coordinates (latitude, longitude, and altitude) on a map.

The software enables user to access business information about places depicted in the picture simply by clicking on the picture or video frame.

The user can input place information directly through the picture to update the information on a place database.

The information can be in the form of both text and multimedia.

The invented system enables user to have videos or pictures through which user can interact to get additional business related information.

The business information posted and accessed by the user could be diverse ranging from store information, restaurant menus, business reviews, user experiences, personal notes, history, news events, or user generated content.

DETAILED DESCRIPTION

Various methods presented here enables users to post and access information about places directly through pictures and videos taken by cameras. Such a camera can be integrated with a smartphone, tablet, or similar device, but can also be, for example, a digital camera having a microprocessor, a touchscreen, and hardware to support a connection to a network like a cellular network or a WiFi access point. These methods recognize places such as local businesses, restaurants, retail stores, and other points-of-interest in a picture taken with the camera then enables the user to add or access information to places directly through pictures or videos. This provides improvements over existing solutions that require the user to identify the place on a map.

Figure 1:
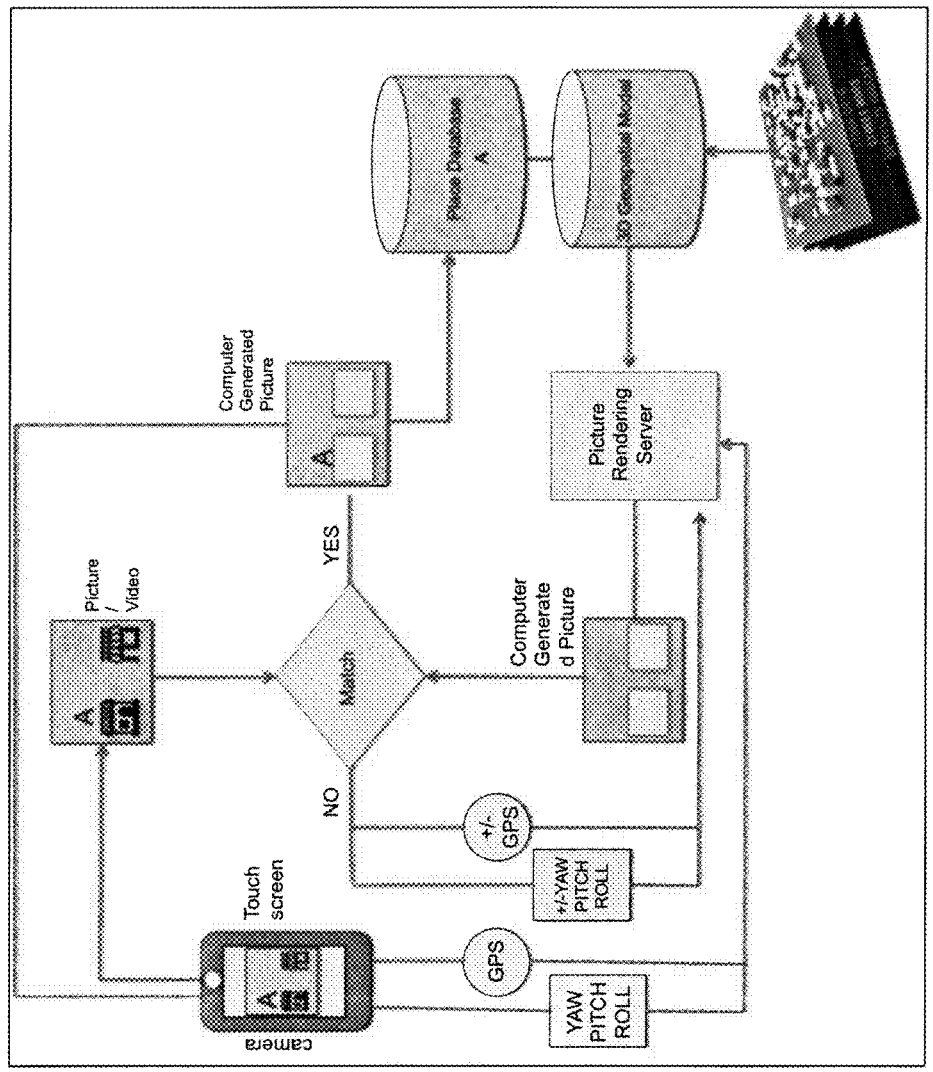
FIG. 1 shows a system and method to access place information through pictures according to an exemplary embodiment of the invention.
Figure 2:
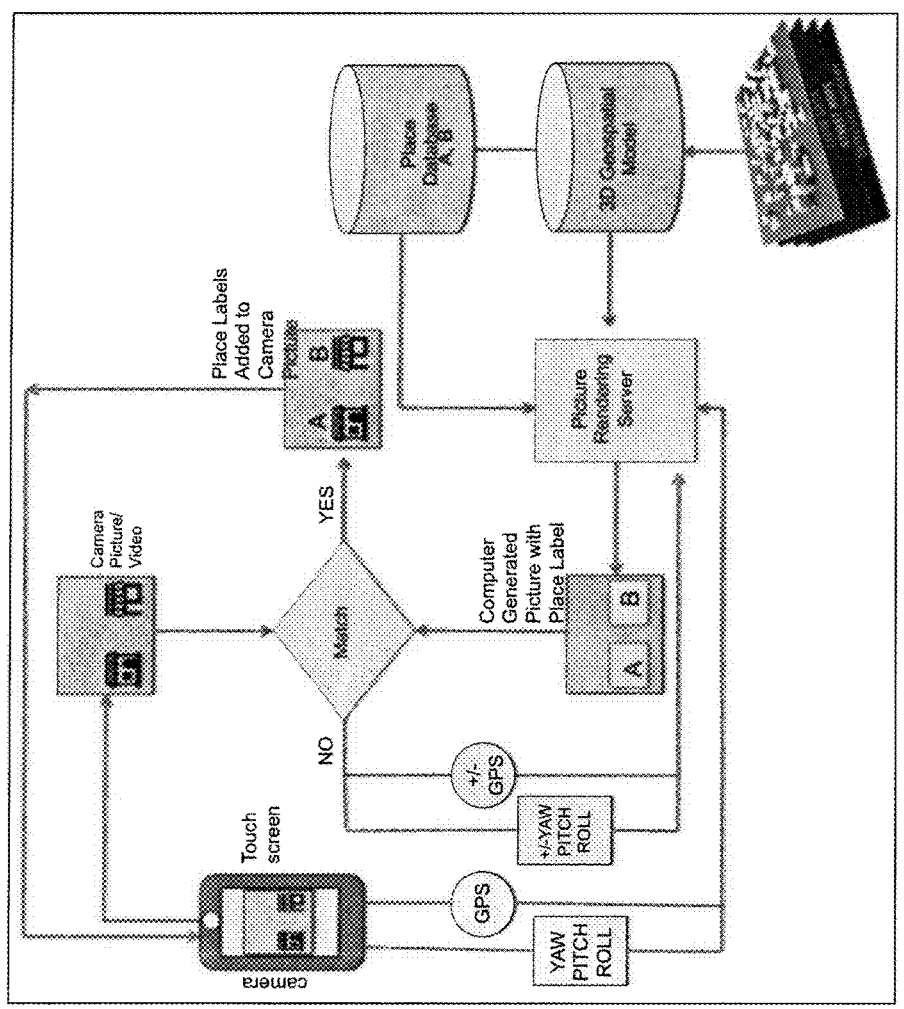
FIG. 2 shows a system and method to add place information through pictures according to an exemplary embodiment of the invention.

FIGS. 1 and 2 provide an overview of the present invention. FIG. 1 shows the acquisition of a picture or a video with a camera of a smartphone having a touchscreen. The smartphone concurrently acquires its own physical location and orientation information. A GPS sensor, or other location determining means, attached to the camera provides the location of the camera in a map coordinate system. The orientation of the camera includes the yaw, pitch, and roll and can be measured by, for example, by any of a gyroscope, accelerometer, or magnetometer, or combination thereof, attached to the camera.

The smartphone is in communication with a picture rendering server and a place database. The picture rendering server is in further communication with a 3D geospatial model which is, in turn, in communication with a place database. The 3D geospatial model receives various inputs including, for example, LIDAR data, street maps, and satellite imagery. As shown, the picture rendering server uses the 3D model and the location and orientation information to produce a computer-generated picture that is compared with the picture or video acquired by the camera, and iteratively modifies that computer-generated picture until a match is determined. The place database consists of, for instance, names and relevant information including ratings, news, prices, user comments on local businesses, restaurants, retail shops, and other points-of-interest. The place database providing metadata to the 3D geospatial model. FIG. 2 shows the further addition of place labels added to the pictures or videos.

Figure 3:
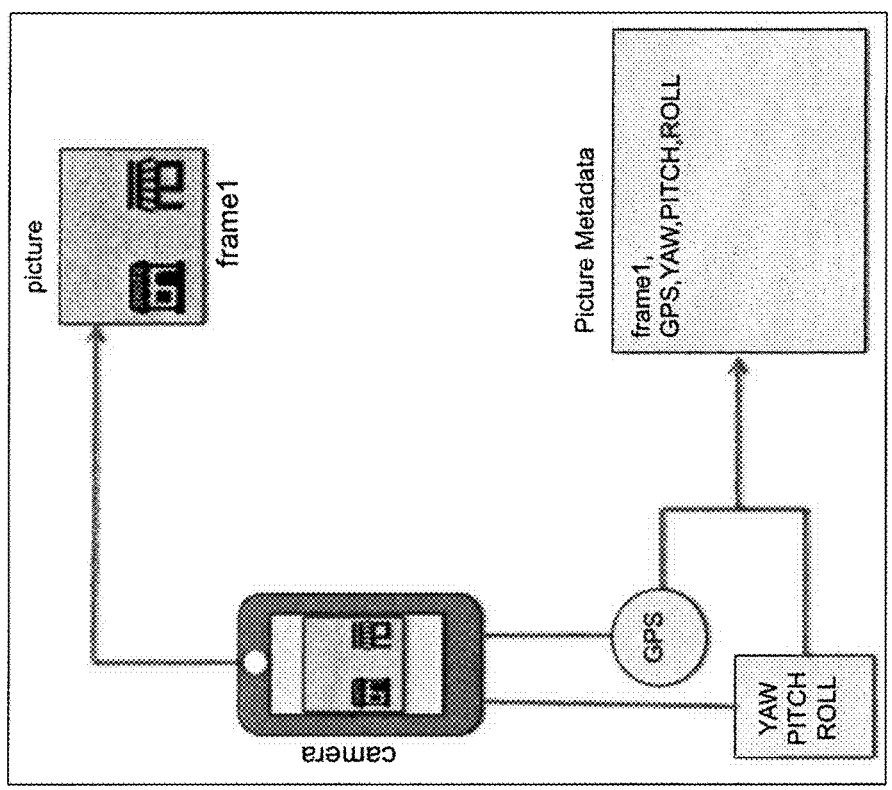
FIG. 3 shows an exemplary digital picture, GPS, and orientation sensors together providing input to the system according to an exemplary embodiment of the invention.
Figure 4:
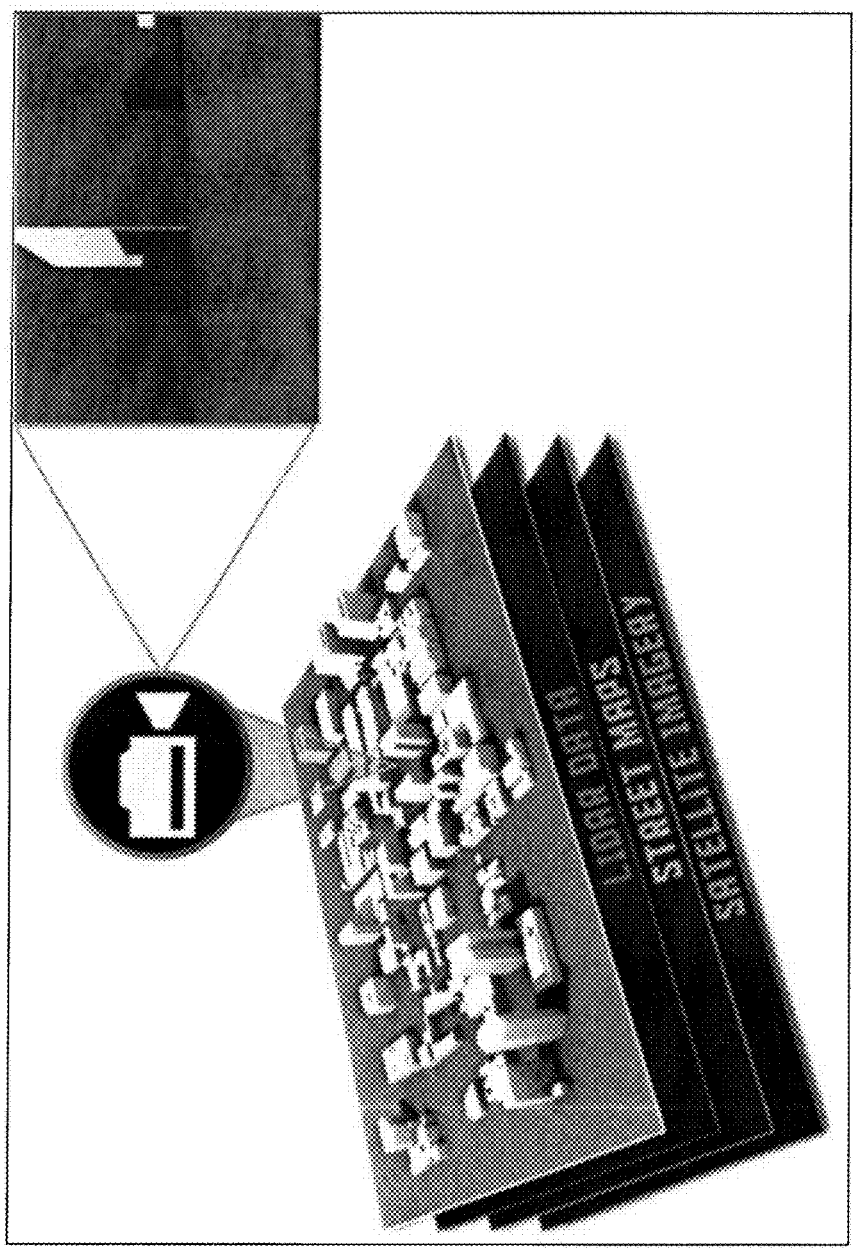
FIG. 4 shows a method using a virtual camera inside a 3D geospatial model to generate a synthetic image according to an exemplary embodiment of the invention.

FIG. 3 shows that the location and orientation of the camera, along with the picture, forms the input to the method. The location and orientation measurement is used to determine a placement of a virtual camera inside the 3D geospatial model. FIG. 4 shows a representation of the virtual camera inside the 3D geospatial model. The 3D geospatial model is composed of data from, for example, LIDAR, satellite imagery, terrain, and other maps. The virtual camera placed inside the 3D geospatial model produces synthetic (computer-generated) pictures that are compared with the picture or video taken by the camera.

Figure 5:
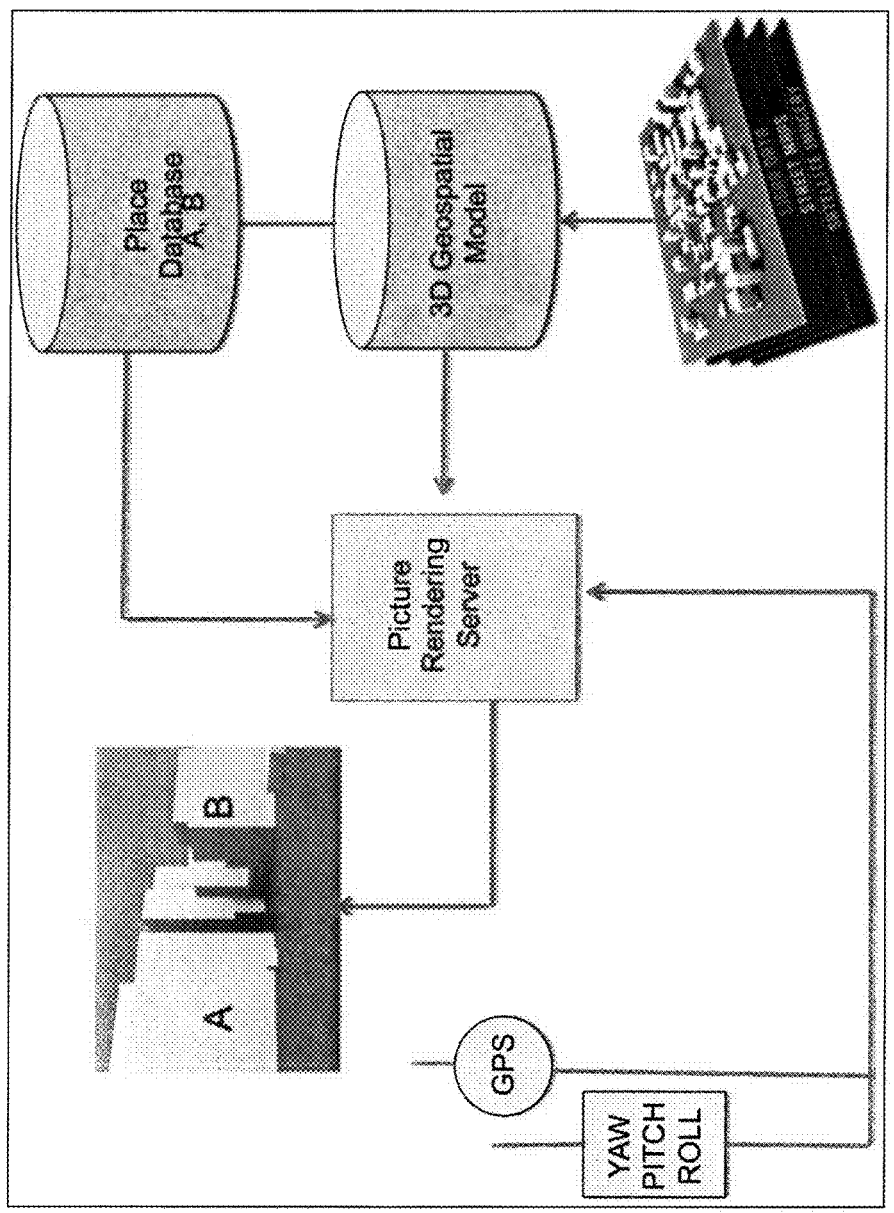
FIG. 5 shows a method using a 3D geospatial model and a place information database to generate a synthetic picture with place labels using a picture rendering server according to an exemplary embodiment of the invention.

FIG. 5 further shows an exemplary method to generate synthetic pictures using the 3D geospatial model. The virtual camera is implemented inside the picture rendering server as a software. The picture rendering server generates computer generated imagery using the 3D geospatial model using the camera location and orientation measurements as input. The place information contained in the place database is used to provide pixel labels to the computer generated imagery.

Figure 6:
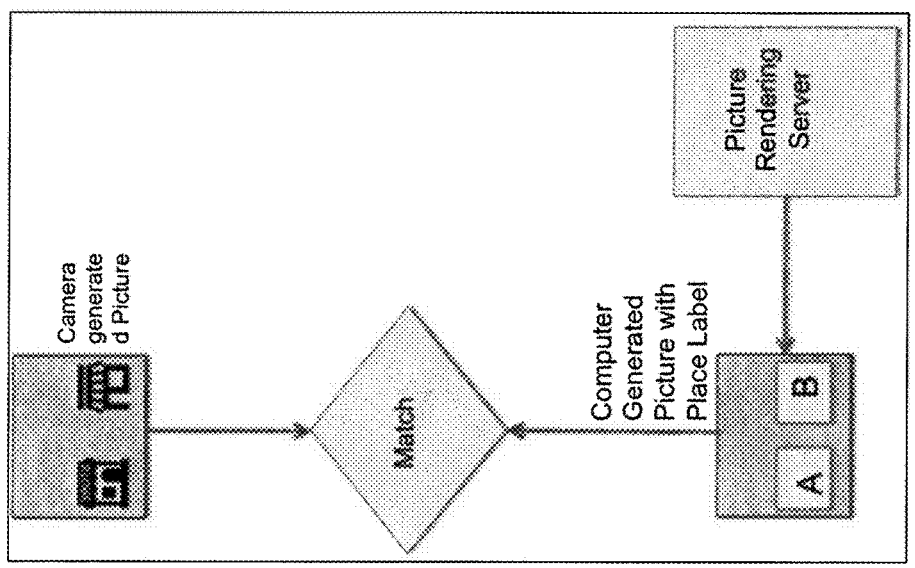
FIG. 6 shows computer-generated imagery being compared with a user taken-picture to determine a match according to an exemplary embodiment of the invention.

Next the computer-generated imagery (CGI) produced by the picture rendering server is compared with the camera-acquired (real) picture as shown by FIG. 6. If the CGI and real picture match sufficiently then the pixel label from the CGI is transferred to the real picture. The transferred pixel label is used to access place information from place database. The matching process can involve one or more of low-level, mid-level, and high-level matching. In low-level matching, corners or edges of structures in the picture such as building, road, or utility poles are matched between CGI and real picture. In the mid-level matching planar surfaces such as building facades, hill contours, or road beds are matched between the CGI and real picture. In high-level matching store or business information such as business names or other visual attributes extracted from the real picture are matched to the CGI for evaluating the match. The method performs the matching at a single level or through a combination different levels.

Figure 7:
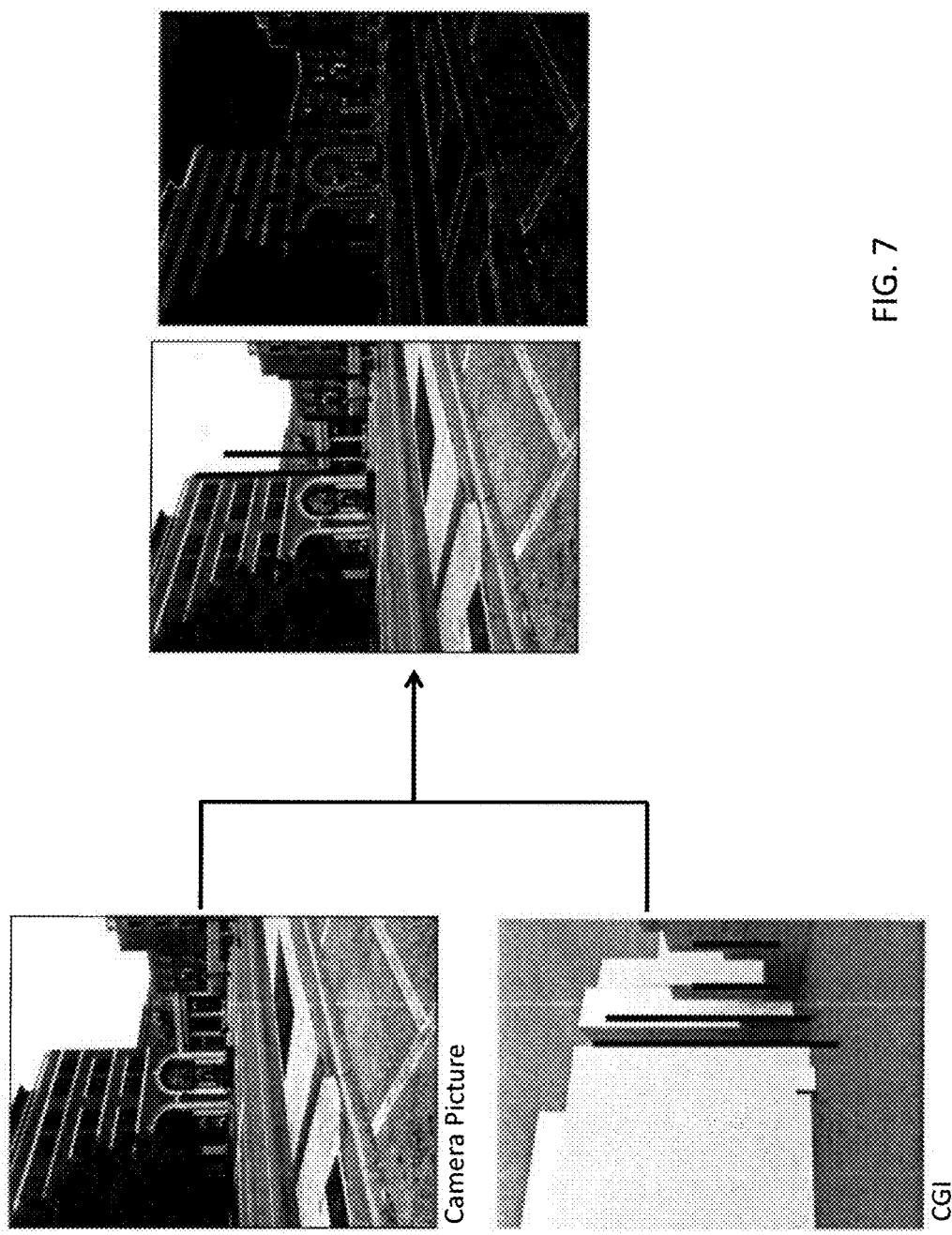
FIG. 7 shows a low-level matching process according to an exemplary embodiment of the invention.

FIG. 7 shows an exemplary low-level matching process. Here, vertical edges are identified within the computer-generated image, lines corresponding to those vertical edges are projected onto the real image, and a matching score is calculated. The matching score depends on the fit of the projected lines to the corresponding edges found in the real image.

Figure 8:
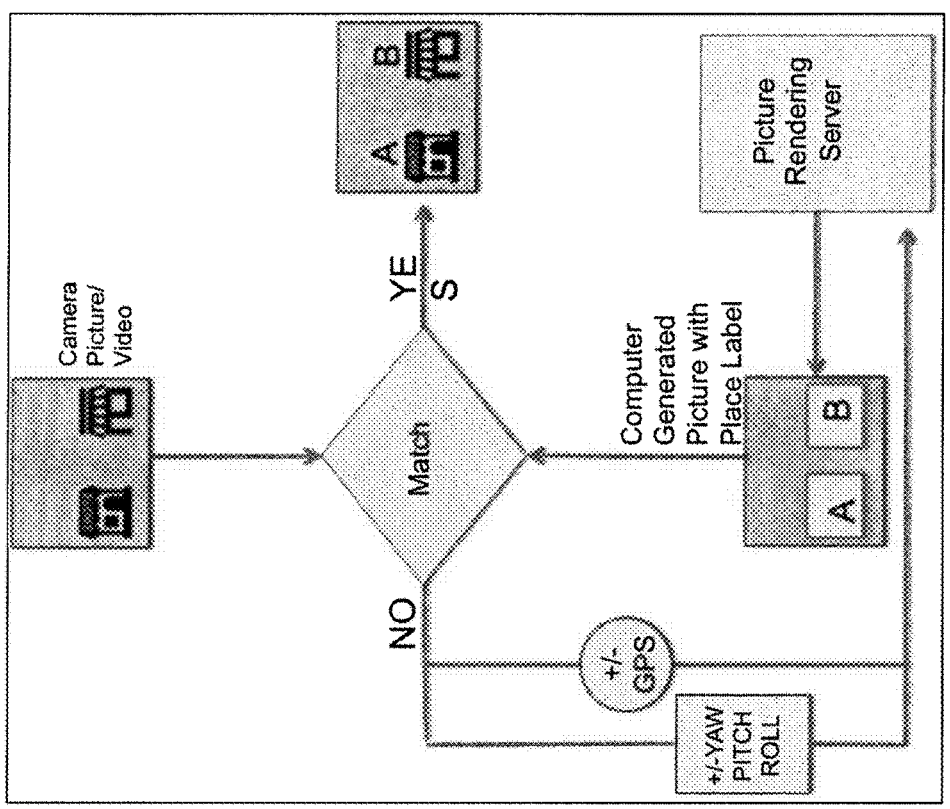
FIG. 8 shows a method of iteratively comparing the input picture with the computer-generated image to reach a match according to an exemplary embodiment of the invention.
Figure 9:
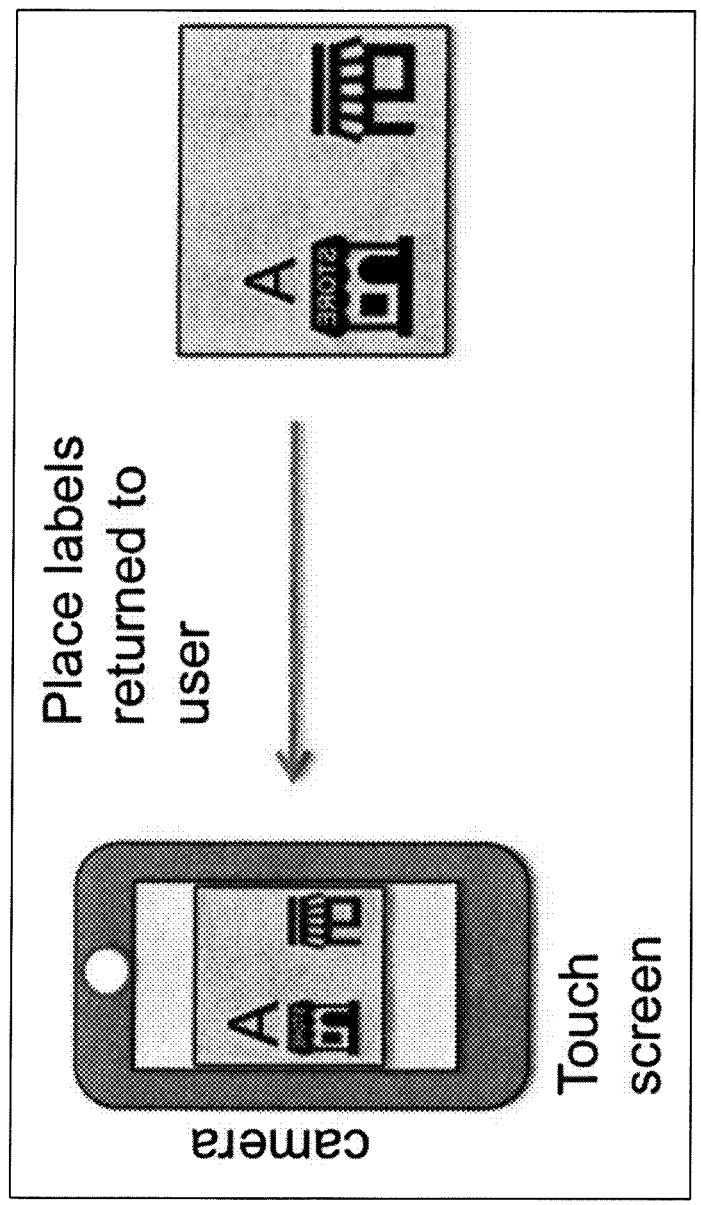
FIG. 9 shows a place label transferred from a computer generated image to user-taken picture in response to the user touching the associated place on the picture, according to an exemplary embodiment of the invention.

FIG. 8 shows that an iterative matching process can be used where a sufficient match is not achieved on the first comparison. In the iterative process, the CGI is repeatedly generated by adjusting the location and/or orientation parameters of the virtual camera within the 3D model until the matching score exceeds a predetermined threshold. When a match between the CGI and the real picture is determined, place labels are transferred from the CGI to the real picture as shown in FIG. 9. The user can then click on place labels projected onto the real image to retrieve information associated with the places.

Figure 10:
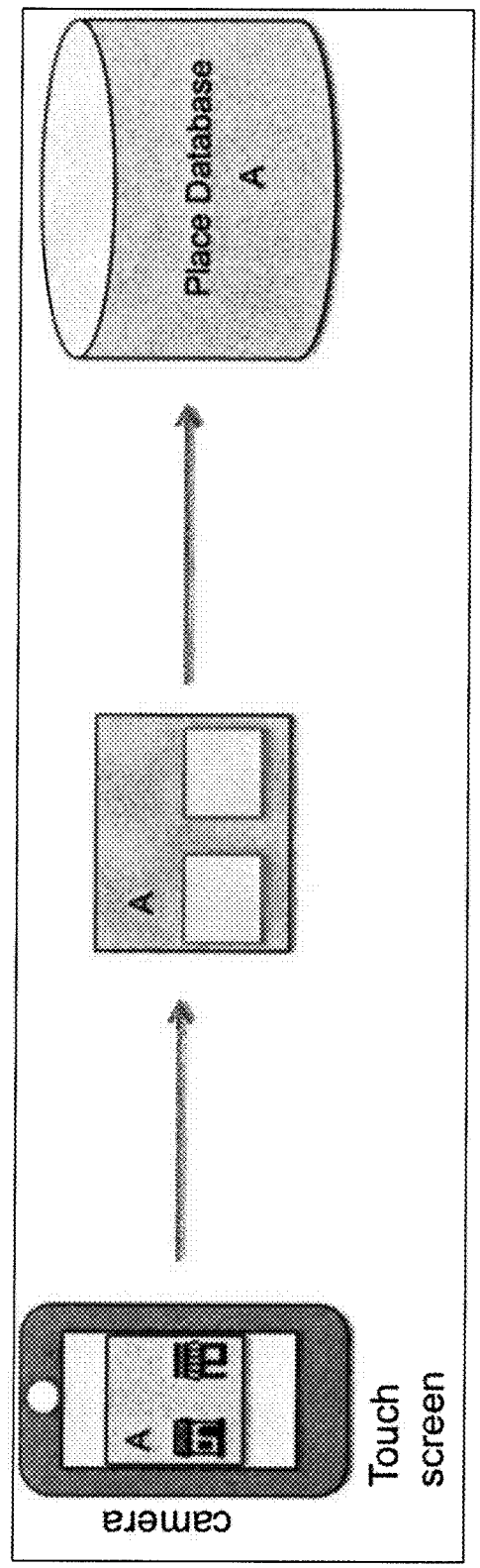
FIG. 10 shows a transfer of a place label provided by a user to a place database according to an exemplary embodiment of the invention.

Users can also contribute place information, as shown in FIG. 10. Once the match between the CGI and the real picture is determined, the user can touch a location to establish a new label, and associate text through the touchscreen to that label, the information is then transferred to the CGI, and then stored in the place database.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method for accessing place data, the method comprising:
receiving a picture acquired with a camera at a time;
receiving spatial coordinates and orientation information for the camera at the time;
placing a virtual camera within a 3D geospatial model at the spatial coordinates and with the orientation and generating a computer-generated image from the virtual camera, the computer-generated image being generated using a microprocessor;
iteratively changing the computer-generated image by iteratively changing the location and orientation of the virtual camera within the 3D geospatial model until the computer-generated image matches the acquired picture to within a threshold;
receiving a location within the acquired picture; and
transferring a place label from the computer-generated image to the acquired picture at the location.

2. A method for determining a camera location, the method comprising:
receiving an image acquired with a camera at a time;
receiving first spatial coordinates and orientation information for the camera at the time;
placing a virtual camera within a 3D geospatial model at the spatial coordinates and with the orientation and generating a computer-generated image from the virtual camera;
iteratively changing the computer-generated image by iteratively changing the location and orientation of the virtual camera within the 3D geospatial model until the computer-generated image matches the acquired image to within a threshold, the location and orientation of the virtual camera being changed automatically using a microprocessor;
determining second spatial coordinates and orientation information for the camera at the time based on the location and orientation of the virtual camera, the second spatial coordinates and orientation information resulting in a better match between the computer generated image and the acquired image relative to the first spatial coordinates and orientation; and
looking up information regarding a real-world object within the acquired image and providing the information to the camera.

3. The method of claim 2, wherein the first spatial coordinates are received from a Global Positioning System.

4. The method of claim 2, wherein the iteratively changing of the computer generated image is performed automatically using the microprocessor.

5. The method of claim 2, wherein the 3D geospatial model is generated based on street maps.

6. The method of claim 2, wherein the 3D geospatial model is generated based on LIDAR data.

7. A method for determining a camera location, the method comprising:
- receiving an image acquired with a camera at a time;
- identifying first structures within the acquired image;
- receiving first spatial coordinates and orientation information for the camera at the time;
- placing a virtual camera within a 3D geospatial model at the spatial coordinates and with the orientation and generating a computer-generated image from the virtual camera, the computer-generated image including second structures, wherein a location of the second structures within the 3D geospatial model is generated based on satellite imagery;
- iteratively changing the computer-generated image by iteratively changing the location and orientation of the virtual camera within the 3D geospatial model until the second structures of the computer-generated image match the first structures of the acquired image to within a threshold, the location and orientation of the virtual camera being changed automatically using a microprocessor; and
- determining second spatial coordinates and orientation information for the camera at the time based on the location and orientation of the virtual camera, the second spatial coordinates and orientation information resulting in a better match between the computer generated image and the acquired image relative to the first spatial coordinates and orientation.

8. The method of claim 7, wherein the first and second structures include corners or edges of a building.

9. The method of claim 2, further comprising identifying a location of a real-world object in the acquired image based on the second spatial coordinates and orientation information.

10. The method of claim 2, further comprising identifying location of an object in the acquired image on a map based on the second spatial coordinates.

11. The method of claim 2, further comprising adding an identifier of a real world object within the acquired image to the acquired image.

12. The method of claim 1, wherein the spatial coordinates are received from a Global Positioning System.

13. The method of claim 1, wherein the iteratively changing of the computer generated image is performed automatically.

14. The method of claim 7, wherein the first and second structures include a road.

15. The method of claim 1, wherein the computer-generated image matches the acquired picture based on corners or edges of a building.

16. The method of claim 1, further comprising identifying a location of a real-world object in the acquired picture based on the second spatial coordinates and orientation information.

17. The method of claim 1, further comprising looking up information on a real-world object within the acquired picture and providing the information to the camera.

18. The method of claim 1, further comprising identifying location of object in the acquired picture on a map based on the second spatial coordinates.

19. The method of claim 1, further comprising adding an identifier of a real world object within the acquired picture to the acquired picture.

20. The method of claim 2, wherein the 3D geospatial model is generated based on terrain map derived from satellite sources.

21. The method of claim 2, wherein the computer-generated image matches the acquired image based on a road orientation.

22. The method of claim 2, wherein the computer-generated image matches the acquired image based on location of utility poles, location of traffic controls or location of vegetation.

* * * * *